United States Patent [19]

Schwan

[11] 3,905,975

[45] Sept. 16, 1975

[54] 2-(5-NITRO-2-FURYL)-5-CHLOROPYRIMIDINE

[75] Inventor: Thomas J. Schwan, Norwich, N.Y.

[73] Assignee: Morton-Norwich Products, Inc., Norwich, N.Y.

[22] Filed: Oct. 1, 1973

[21] Appl. No.: 402,573

[52] U.S. Cl. ............................. 260/251 R; 260/999
[51] Int. Cl.² ....................................... C07D 239/02
[58] Field of Search .................................. 260/25 R

[56] References Cited
UNITED STATES PATENTS 3,706,745   12/1972   Berger et al. ................ 260/256.4 N

*Primary Examiner*—Raymond V. Rush
*Attorney, Agent, or Firm*—Anthony J. Franze

[57] ABSTRACT

2-(5-Nitro-2-furyl)-5-chloropyrimidine is useful as an antibacterial and is also useful in combatting infection in poultry.

1 Claim, No Drawings

2-(5-NITRO-2-FURYL)-5-CHLOROPYRIMIDINE

This invention relates to a new nitrofuran compound, 2-(5-nitro-2-furyl)-5-chloropyrimidine. It possesses a broad spectrum of antibacterial activity and is thus adapted to be combined in various forms such as dusts, sprays, solutions, suspension, unguents and the like using commonly employed excipients to provide compositions capable of inhibiting and eradicating susceptibe bacterial species. The gamut of its antibacterial potency as determined using the common employed serial dilution technique is illustrated here below:

| Organism | Minimum inhibiting concentration in mcg/ml |
|---|---|
| S. aureus | 12.500 |
| E. coli | 0.190 |
| S. typhosa | 0.380 |
| A. aerogenes | 25.000 |
| Corynebacterium liquefaciens | 50.000 |
| Shigella flexneri | 1.500 |

When combined in the diet of chickens at a level of 0.022% by weight thereof and offered ad libitum as the food supply, diseases in that species caused by *E. coli* airsacculitis; coccidiosis caused by *Eimeria tenella*; and salmonellosis caused by *Salmonella typhimurium* are effectively combatted.

In order that this invention may be readily available to those skilled in the art, the now preferred method for its preparation is described.

A. 5-Chloro-2-furyl-4-pyrimidinecarboxylic Acid

Two solutions were prepared: Solution A contained sodium methoxide (852 g, 15.78 moles) in 6360 ml of methanol, and solution B contained mucochloric acid (903 g, 5.34 moles) in 2285 ml of methanol.

A 22-1. flask equipped with mechanical stirrer, thermometer, condenser and dropping funnel was charged with a solution of 2-furanamidine hydrochloride in methanol (2610 ml, 7.88 moles). The solution was heated (steam bath) to 55° and then treated in one portion with solution A (3800 ml). The reaction was endothermic (temp. 30°) and was reheated to 55°. Solution B (1625 ml) was introduced at such a rate that the reaction temperature was kept between 55° and 60° (cooling was necessary). After the addition was completed, the solution was stirred at 55°–60° for 5 hr. The remainder of solution A was added. The temperature again lowered and was raised (steam bath) to 55°. The remainder of solution B was introduced slowly after which the reaction mixture was stirred for 2.5 hr. at 55–60. The material was cooled overnight and then filtered. The filter cake was washed with a minimum amount of cold methanol. The solid was then dissolved in 10 l. of water and the solution treated with 6 N hydrochloric acid to pH 1–2. The resulting precipitate was cooled overnight and then filtered. The filter cake was washed with water and dried at 60° to constant weight to give 473 g (39%) of product melting at 153°–154°.

Recrystallization from water raised the melting point to 161°–162°.

Anal. Calcd. for $C_9H_5ClN_2O_3$: C, 48.13; H, 2.24; N, 12.47; Cl, 15.79. Found: C, 48.17; H, 2.34; N, 12.07; Cl, 15.86, 15.94.

B. 2-(2-Furyl)-5-chloropyrimidine

A 2-1. 3-necked flask, equipped with two condensers, was charged with 2-(2-furyl)-5-chloro-4-pyrimidinecarboxylic acid (300 g, 1.33 moles). The acid was heated to melt and held for 5–10 min. The resulting dark mass was cooled and then dissolved in 1000 ml of boiling chloroform, decolorized and filtered hot. The chloroform solution was concentrated under reduced pressure to give 238 g (98%) or product, m.p. 106°–109°.

Recrystallization from heptane raised the melting point to 108° – 110°.

Anal. Calcd. for $C_8H_5ClN_2O$: C, 53.20; H, 2.79; N, 15.51; Cl, 19.63. Found: C, 53.05; H, 3.08; N, 15.00; Cl, 19.52.

C. 2-(5-Nitro-2-furyl)-5-chloropyrimidine

To 600 ml acetic anhydride was added 50 ml (0.78 mole) concentrated nitric acid over 40 min, the reaction temperature being maintained between 28°–35° during the addition by intermittent use of an ice bath. The mixture was stirred at ambient temperature for 70 min., cooled to 5°–10°, and 100 g (0.51 mole) 2-(2-furyl)-5-chloropyrimidine was added quickly. The mixture was allowed to slowly reach room temperature, and was then stirred at 20°–30° for 2.5 hr., an ice bath being used to maintain the temperature below 30°. The product was filtered, washed with three 100 ml portions of ether, and air dried to give 19.6 g (17%) of product, m.p. 225°–228°.

Recrystallization from ethyl acetate raised the melting point to 226°–228°.

Anal. Calcd. for $C_8H_4ClN_3O_3$: C, 42.59; H, 1.79; N, 18.63. Found: C, 42.46; H, 1.79; N, 18.42.

What is claimed is:
1. The compound 2-(5-nitro-2-furyl)-5-chloropyrimidine.

* * * * *